Patented Sept. 29, 1953

2,653,979

UNITED STATES PATENT OFFICE 2,653,979

PREPARATION OF DIARYLETHANES

Edward L. Kropa, Old Greenwich, and Arthur S. Nyquist, Cos Cob, Conn., assignors to American Cyanamid Company, New York, N. Y., a corporation of Maine No Drawing. Application November 5, 1948, Serial No. 58,604

6 Claims. (Cl. 260—668)

This invention relates to processes of producing diaryl paraffins and more particularly, to processes of producing diarylethanes.

In the past, diaryl paraffins have been produced by various methods. A few hydrocarbons, such as toluene and xylene, have been reacted with acetylene to produce the corresponding diaryl paraffins but this method resulted in low yields and production of a mixture of isomers. Furthermore, the proportions of acetylene which might be used without the formation of large proportions of by-products such as anthracene derivatives were extremely low as compared with the theoretical proportions of acetylene required to react with all of the hydrocarbon.

A process for the preparation of diaryl paraffins developed by Murray Gray Sturrock, Thomas Lawe, and Woodrow Ernest Kemp, and described and claimed in their U. S. Patent No. 2,439,228, constituted an improvement over the prior art processes involving the use of acetylene. According to the patented process an aryl compound, such as toluene, is condensed with a saturated aliphatic organic compound having a carbonyl group and at least two carbon atoms, such as acetaldehyde, in the presence of hydrogen fluoride as a catalyst.

A further improvement in processes for the production of diaryl paraffins was developed by Woodrow Ernest Kemp and is described in his copending application, Serial No. 771,154, filed August 28, 1947, now abandoned. Kemp's process comprises the use of a mixture of hydrogen fluoride and fluosulfonic acid as the catalyst for condensation of an aryl compound with acetaldehyde, isopropanol, di-isopropyl ether, or the like.

An object of the present invention is to provide a new method of producing diaryl paraffins.

A further object of the present invention is to provide a new method of producing asymmetric diarylethanes.

The above and other objects are attained by condensing an aryl compound with vinyl acetate in the presence of an alkylation catalyst.

The invention will be described in greater detail in connection with the following specific examples in which the proportions are given in parts by weight. It should be understood that the examples are merely illustrative, and the invention is not to be limited to the specific details thereof.

*Example 1*

300 parts toluene (3.3 mols).
60 parts concentrated sulfuric acid.
60 parts vinyl acetate (0.7 mol).
200 parts water.

The toluene and sulfuric acid are mixed together in a suitable vessel equipped with means for agitation, means for registering temperature and condensation means. The mixture is agitated vigorously while the vinyl acetate is gradually added over a period of 90 minutes. The temperature is maintained at 25–30° C. throughout the addition. Stirring is then continued for an additional 70 minutes. The water is then added and the mixture allowed to stand for about 15–18 hours. The hydrocarbon layer which separates out is successively washed twice with water, once with dilute sodium carbonate solution and twice more with water. It is finally dried over anhydrous sodium sulfate.

Unreacted material is distilled off and 21 parts of residue are obtained. This residue is distilled under reduced pressure. 10 parts of yellowish liquid distilling at 100–144° C. at 6–7 mm. is collected with nearly all of the material coming over at 140–144° C. The refractive index of the distillate is 1.5531 at 25° C. A small sample of the distillate is found to be completely non-saponifiable when refluxed for 2 hours with 0.5 N alcoholic potassium hydroxide.

Ditolylethane has a refractive index of 1.5586 at 25° C. and it boils at 151–152° C. at 10 mm. The agreement of boiling point and refractive index with known values and the non-saponifiable nature of the product of the example indicate that it consists chiefly of ditolylethane.

*Example 2*

300 parts toluene (3.3 mols).
50 parts boron fluoride-ethyl ether complex.
75 parts vinyl acetate (0.9 mol).
100 parts water.

The toluene and boron fluoride-ethyl ether complex are mixed together in a suitable vessel equipped as described in Example 1, and the resulting solution is maintained at 27–34° C. with vigorous agitation while the vinyl acetate is gradually added over a period of 65 minutes. Stirring is continued for 220 minutes during which period the temperature of the mixture maintains itself at 34° C. The water is then added to destroy the catalyst, and stirring is continued for an additional 75 minutes.

The organic layer which separates after stirring is discontinued is drawn off and washed three times with water. Upon distillation to remove unreacted material 20 parts of a semiviscous residue are obtained. This residue is further distilled to recover the ditolylethane formed in the reaction.

Example 3

300 parts toluene (3.3 mols).
45 parts p-toluenesulfonic acid monohydrate.
60 parts vinyl acetate (0.7 mol).

200 parts of the toluene and the p-toluenesulfonic acid monohydrate are mixed together and refluxed until 4.5 parts of water has been drawn off. The toluene solution is then transferred to a suitable vessel equipped as described in Example 1, and the additional 100 parts of toluene are added. The vinyl acetate is then added gradually over a period of 100 minutes while the solution is vigorously agitated at 92° C. The stirring and heating are continued for 40 minutes after which period the reaction mixture is cooled.

The dark colored solution is successively washed with water, dilute sodium carbonate and more water, and it is finally dried over anhydrous sodium sulfate.

Upon distillation to recover unreacted material 30 parts of a viscous residue are obtained. This residue is distilled at 1-2 mm. pressure and three fractions of 2-3 parts each are collected as follows:

|    | Boiling Point in °C. | Refractive Index at 25° C. |
|----|----------------------|----------------------------|
| #2 | 91-114               | 1.5085                     |
| #3 | 114-128              | 1.5278                     |
| #4 | 128                  | 1.5510                     |

Other aryl compounds may be reacted with vinyl acetate in accordance with the process of the present invention. The most reactive aryl compounds are those having nuclear methyl constituents. For example, benzene itself is much less active than toluene or any of the xylene isomers, as are also naphthalene and diphenyl. Nuclear chlor-substituted compounds may be reacted with vinyl acetate in accordance with our invention, but the reactivity of these compounds also is extremely low by comparison with the activity of the nuclear methyl-substituted aryl compounds. Thus aryl compounds which may be reacted with vinyl acetate to produce diarylethanes in accordance with the process of the present invention are those which contain at least one hydrogen atom attached to an aromatic nucleus and include toluene, the isomeric xylenes, thiophene, methyl thiophene, phenol, cresol, xylenol, naphthalene, dimethyl aniline, aniline, diethyl aniline, diphenyl, benzene, any of the nuclear halo-substituted aryl compounds such as chlorbenzene, each of the mono- and di-bromtoluenes, each of the fluor-xylenes, the ethyl xylenes, and the like.

If desired, inert solvents may be employed in our process for condensing aryl compounds with vinyl acetate. Examples of such inert solvents include the chlorinated solvents such as chloroform, carbon tetrachloride, and the like.

Any alkylation catalyst such as aluminum chloride, concentrated sulfuric acid, boron fluoride, p-toluenesulfonic acid, p-toluenesulfonamide, hydrogen fluoride, fluosulfonic acid, etc., may be used.

Relative molar proportions of vinyl acetate and aryl compound must be at least 1:2. Actually we prefer using the aryl compound in excess, i. e., relative molar proportions of about 1:3 to about 1:6, but there is no real top limit to the amount of aryl compound used. Obviously too large an excess, while it does no harm in the reaction mixture, is wasteful and uneconomical.

The optimum amount of catalyst will depend to some extent on the particular aryl compound and the particular catalyst used. In general, we have found from about 0.5% to about 10% by weight, based on the total weight of the reaction mixture, suitable.

The reaction of vinyl acetate with an aryl compound to produce a diarylethane in accordance with our invention may be carried out at temperatures ranging from about −10° C. to about 100° C. Generally we find that the reaction is preferably carried out in the neighborhood of about 20°-50° C.

The diarylethanes produced in accordance with the process of the present invention are especially important in that they may be cracked to produce styrenes, particularly dimethyl styrenes, which in turn are polymerized to useful synthetic resins. The production of vinyl aryl compounds such as the dimethyl styrenes from asymmetric diarylethanes such as those produced in accordance with our invention may be carried out as described in the Sturrock and Lawe U. S. Patents Nos. 2,373,982; 2,420,688; 2,420,689 and 2,422,318, as well as in the patents to Donald R. May and James Kenneth Dixon, either solely or jointly, Nos. 2,422,163; 2,422,164; 2,422,165; 2,422,169 and the Saunders Patent No. 2,422,171.

Many of the diarylethanes produced according to our invention are useful as insecticides or as starting materials in the production of insecticides, as electric insulating media in electric condensers, as starting materials in the production of wetting agents, etc.

We claim:

1. A process which comprises reacting substances consisting of an aryl compound containing at least one hydrogen atom attached to an aromatic nucleus with vinyl acetate in molar proportions of at least 2:1 and in the presence of an alkylation catalyst, whereby a 1,1-diarylethane is produced.

2. A process which comprises reacting substances consisting of an aryl compound of the benzene series having at least one hydrogen atom attached to the benzene nucleus with vinyl acetate in molar proportions of at least 2:1 and in the presence of an alkylation catalyst, whereby a 1,1-diarylethane is produced.

3. A process which comprises reacting substances consisting of toluene with vinyl acetate in molar proportions of at least 2:1 and in the presence of an alkylation catalyst, whereby 1,1-ditolylethane is produced.

4. A process according to claim 3 in which the alkylation catalyst is concentrated sulfuric acid.

5. A process according to claim 3 in which the alkylation catalyst includes boron fluoride.

6. A process according to claim 3 in which the alkylation catalyst is p-toluenesulfonic acid.

EDWARD L. KROPA.
ARTHUR S. NYQUIST.

References Cited in the file of this patent

UNITED STATES PATENTS

| Number    | Name           | Date          |
|-----------|----------------|---------------|
| 2,143,493 | Stanley et al. | Jan. 10, 1939 |
| 2,386,507 | Quin           | Oct. 9, 1945  |
| 2,437,356 | Hill           | Mar. 9, 1948  |
| 2,439,228 | Sturrock et al.| Apr. 6, 1948  |
| 2,462,792 | Wadsworth et al.| Feb. 22, 1949 |